Patented Apr. 30, 1940

2,198,625

UNITED STATES PATENT OFFICE 2,198,625

METHOD FOR THE REMOVAL OF SULPHUR COMPOUNDS FROM IRON

Heinrich Koppers, Essen, Germany, assignor to Heinrich Koppers Gesellschaft mit beschränkter Haftung, Essen, Germany No Drawing. Application October 29, 1938, Serial No. 237,743. In Germany October 29, 1937

5 Claims. (Cl. 75—54)

The present invention relates to a method for removing the sulphur or sulphur compounds from iron of any kind and more particularly to the removal of sulphur or sulphur compounds from iron by treating the iron in liquid state with sodium oxide and calcium oxide and converting the sulphur or sulphur compounds into sodium sulphide and calcium sulphide.

According to a known method, the sulphur content is removed from the iron withdrawn from blast furnaces, cupola furnaces, mixers or from other sources by treating the iron with sodium carbonate in solid or liquid form.

It is further known to use instead of sodium carbonate alone a solid and lumpy mixture consisting of sodium carbonate, limestone and suitable fluxes. Each of these hitherto used methods results, however, in introducing a considerable quantity of oxygen into the liquid iron. Moreover, if the mixture is added to the iron in lumpy form, a large excess of limestone has to be added on account of the inhomogeneous distribution of the limestone in order to bind the sulphur extracted from the bath in the form of $Na_2S$ and $CaS$. In this way a slag formed by adding soda, limestone and fluxes to a pig iron containing a high quantity of sulphur, still contains 23% of CaO besides 14% $Na_2S$ and 4.2% CaS. Therefore the capacity for forming sulphides with such a mixture of sodium and calcium is only utilised to a rather small extent.

When the iron reacts upon the mixture of sodium carbonate, limestone and the additions, large quantities of oxygen are liberated, since that quantity of oxygen which is in the carbonates, besides that quantity of oxygen which is formed into carbon monoxide, reacts with the iron bath or certain constituents thereof. Accordingly, certain quantities of silicon, manganese, and carbon are oxidised and a slag is produced which contains a comparatively high percentage of $SiO_2$ and a considerable amount of MnO. Although it is sometimes desirable to reduce the Si content of the iron, the reduction of the Mn percentage in the iron for subsequent processes is generally troublesome.

Now, the principal object of my present invention is to overcome these difficulties that result from the heretofore used additions, of high oxygen content, to liquid iron for the desulphurisation thereof, thus producing a high grade pig iron.

The invention provides for adding Na and Ca as sodium calcium ferrite in solid or liquid form to the liquified iron for the removal of sulphur compounds.

Calcium ferrites may be produced with different proportions of CaO, and so have widely differing melting points. It has, however, been found that the melting temperature of calcium ferrite is only low in those cases when the portion by weight of CaO in the mixture varies between 10 and 40%. If the portion by weight of CaO in the ferrite is less than 10% or more than 40% by weight, the melting point of the mixture regularly rises to a considerable extent. The melting point lies for instance at 1290 centigrades with 10% by weight of CaO and drops to 1220 centigrades with 26–30% by weight and rises again to 1370 centigrades with 50% by weight of CaO.

The addition of sodium oxide to calcium ferrite still further reduces the melting temperatures by about 10 to 12%.

Since the temperature of the iron coming for instance from the blast furnace lies at about 1350–1400 centigrades, the iron contains such quantity of heat as will be sufficient under certain circumstances to induce the reaction between the ferrite and the sulphur of the iron even in case the ferrite is added to the iron in solid form. The influence of the constituents upon the iron will, however, be considerably more intensive if the addition of sodium, calcium ferrite is made in liquid form to the iron and added to it while in motion.

For comparison of the influence of the additions according to the present invention with the hitherto used additions, I would refer to an article published in the journal "Iron and Coal Trades Review" dated September 3rd, 1937, according to which a mixture of soda, limestone and fluor spar in solid form is added. 560 lbs. of soda, 1500 lbs. of limestone and 560 lbs. of fluor spar are for instance necessary to be added to 104,400 lbs. of pig iron. In the 2620 lbs. of this mixture there are about 243 lbs. $Na_2$, about 888 lbs. Ca, about 568 lbs. CO, about 649 lbs. $O_2$ and about 272 lbs. F. Even assuming that the limestone does not at all react with the constituents of the pig iron and that it is only converted to CaO, there still remain 409 lbs. of $O_2$ which will react with the silicium, manganese and carbon forming oxides thereof.

If a disodium calcium ferrite of the formula $2Na_2O, 2CaO, Fe_2O_3$ is used there is required for the removal of the same quantity by weight of sulphur (about 233 lbs. sulphur against a quantity of pig iron of 104,400 lbs.) 1046 lbs. disodium calcium ferrite, which still maintains a sufficient excess of CaO and yet free oxygen is obtained only in a quantity of 244 lbs.

Preferably, according to the invention, those compositions of sodium calcium ferrite are used which possess besides a low melting point the lowest possible amount of $Fe_2O_3$. In such ferrites, the proportion of CaO to $Fe_2O_3$ varies from 26:74 to 45:55.

The exact composition of the sodium calcium ferrite used according to the invention depends upon the changes which are intended with regard to the composition of the iron. If it is desired to desulphurise exclusively and to refine to a small extent, one uses a sodium calcium ferrite in the form of $2Na_2O, 2CaO, Fe_2O_3$. If more refining is to be done, that is, if the Si, Mn, C constituents of the iron are to be reduced along with the desulphurisation, one uses ferrite of the formula $Na_2O, CaO, Fe_2O_3$ or similar compositions.

In the process known heretofore for the desulphurisation of iron by the addition of soda, a slag was formed which very often still contained sodium oxide in smaller amounts and CaO in larger amounts. This slag is of course extremely dangerous for the transporting vessels and metallurgical furnaces.

In the above example of the desulphurisation as used heretofore by the addition of soda, limestone and fluor spar, the iron bath must give up the heat necessary for heating the addition to about 1300 centigrades to melt it as well as the heat required for the reduction of 1500 lbs. $CaCO_3$ to $CaO+O+CO$, of 560 lbs. $Na_2CO_3$ to $$Na_2+O_2+CO$$

and of a portion of the 560 lbs. $CaF_2$ to $Ca+F_2$, calculated for 104,400 lbs. of iron.

The heat is obtained from the combustion of

| | Pounds |
|---|---|
| Si | 214 |
| Mn | 140 |
| Fe | 140 |

The heat used exceeds, however, the heat recovered by about 380,000 Kcal. The pig iron bath therefore cools down 70-80 centigrades on account of the manipulation. If on the other hand the same quantity of pig iron, namely 104,400 lbs. is treated with 1046 lbs. of $2Na_2O, 2CaO, Fe_2O_3$ in liquid form according to this invention, then the heat recovered from the combustion of Si, Mn, and C is more than is necessary for the reduction of the addition, namely by about 400,000 Kcal.

Therefore the temperature of the pig iron bath rises by 60-70 centigrades. Even if disodium calcium ferrite is added in solid form, there is still a temperature rise of 40-50 centigrades. The loss in heat which results from the repeated pouring from one ladle into another one in order to intimately mix the pig iron with the slag to convert as much sulphur from the pig iron into $Na_2S$ and CaS as possible, is therefore completely equalized.

I have now above described my present invention on the lines of a preferred embodiment thereof but my invention is not limited in all its aspects to the mode of carrying it out as described, since the invention may be variously embodied within the scope of the following claims.

I claim:

1. In a method of removing sulphur compounds from iron which comprises treating the metal in liquid form with sodium and calcium to absorb sulphur with the formation of sodium sulphide and calcium sulphide, the improvement comprising: adding the sodium and calcium to the liquid pig iron as sodium calcium ferrite.

2. The method as claimed in claim 1 and in which the addition of sodium calcium ferrite is added in solid form to the liquid pig iron, the liquid slag thus formed together with the pig iron being poured, for a better mixing, into another container in order to obtain a thorough reaction of the sodium and calcium contained in the slag.

3. In a method of removing sulphur compounds from iron which comprises treating the metal in liquid form with sodium and calcium to absorb sulphur with the formation of sodium sulphide and calcium sulphide, the improvement comprising: adding the sodium and calcium to the liquid pig iron as sodium calcium ferrite in liquid form.

4. In a method of removing sulphur compounds from iron which comprises treating the metal in liquid form with sodium and calcium to absorb sulphur with the formation of sodium sulphide and calcium sulphide, the improvement comprising: adding the sodium and calcium to the liquid pig iron as disodium calcium ferrite.

5. In a method of removing sulphur compounds from iron which comprises treating the metal in liquid form with sodium and calcium to absorb sulphur with the formation of sodium sulphide and calcium sulphide, the improvement comprising: adding the sodium and calcium to the liquid pig iron as sodium calcium ferrite in which the portion by weight of CaO in the calcium ferrite is between 10% to 40%.

HEINRICH KOPPERS.